United States Patent
Onishi et al.

(10) Patent No.: US 6,628,324 B1
(45) Date of Patent: Sep. 30, 2003

(54) VIDEO SIGNAL PRODUCING APPARATUS AND VIDEO SIGNAL PRODUCING METHOD

(75) Inventors: Yasushi Onishi, Tokyo (JP); Osamu Hosotani, Hyogo (JP)

(73) Assignees: Mitsubishi Denki Kabushiki Kaisha, Tokyo (JP); Mitsubishi Electric Semiconductor Application Engineering Corporation, Tokyo (JP)

(*) Notice: Subject to any disclaimer, the term of this patent is extended or adjusted under 35 U.S.C. 154(b) by 0 days.

(21) Appl. No.: 09/546,522

(22) Filed: Apr. 11, 2000

(30) Foreign Application Priority Data

Sep. 30, 1999 (JP) ............................................. 11-280229

(51) Int. Cl.[7] ......................... H04N 17/00; H04N 17/02
(52) U.S. Cl. ......................... 348/177; 348/189; 348/181
(58) Field of Search ................................. 348/179, 181, 348/182, 183, 188, 569, 570, 563, 173, 177, 178, 180, 189, 190; H04N 17/00, 17/02

(56) References Cited

U.S. PATENT DOCUMENTS

| | | | | |
|---|---|---|---|---|
| 4,991,119 A | * | 2/1991 | Traa | 345/440 |
| 5,499,054 A | * | 3/1996 | Lim | 345/467 |
| 5,790,189 A | * | 8/1998 | Moon | 348/189 |
| 6,326,996 B1 | * | 12/2001 | Brabander | 348/180 |

FOREIGN PATENT DOCUMENTS

| | | |
|---|---|---|
| JP | 3-226080 | 10/1991 |
| JP | 10-171441 | 6/1998 |

* cited by examiner

*Primary Examiner*—Michael H. Lee
(74) *Attorney, Agent, or Firm*—Burns, Doane, Swecker & Mathis, LLP

(57) ABSTRACT

When a manufacturer or a user desires to adjust a Braun tube, it is required to display a test pattern satisfying setting conditions of display modes on the Braun tube. To set the display modes of the test pattern, a plurality of horizontal synchronizing signals and a vertical synchronizing signal are generated by a timer circuit for each field. Also, display modes (for example, shape, position, size, color and luminance) of a type of characters having the same shape are set in an OSD circuit to set the display modes of the test pattern composed of the characters having the same shape. Thereafter, a composite video signal of the test pattern satisfying the display modes is produced on the basis of the horizontal synchronizing signals and the vertical synchronizing signal in the OSD circuit, and the test pattern is displayed on the Braun tube according to the composite video signal. Accordingly, because the composite video signal of the test pattern satisfying the display modes can be produced without using any private circuit, the video signal producing apparatus can be produced in a small size and at a low cost.

6 Claims, 13 Drawing Sheets

FIG.4
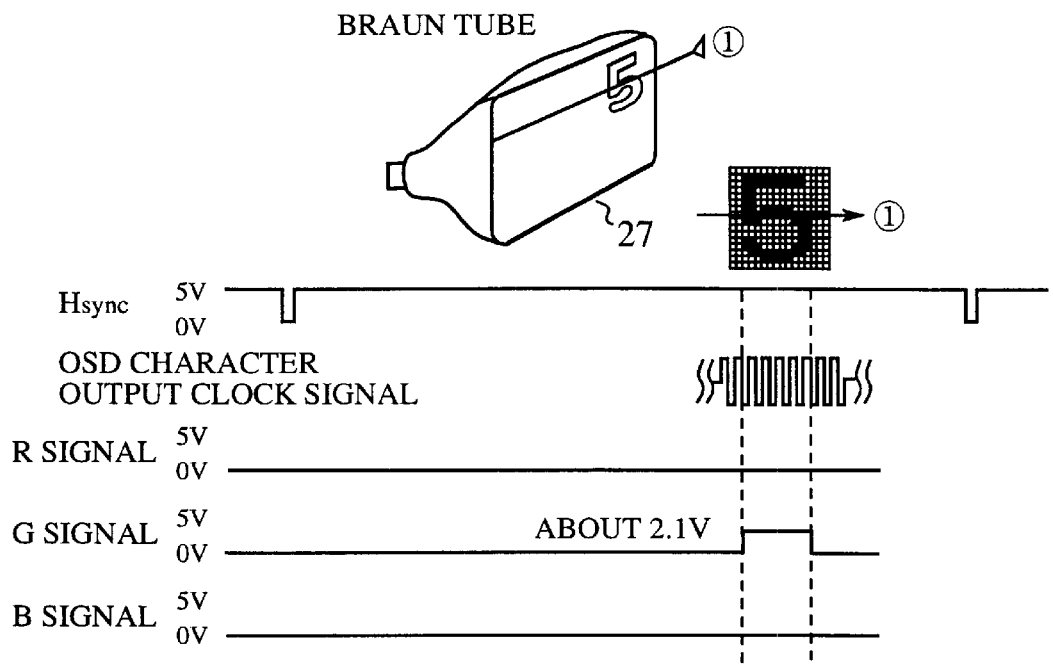
FIG.5A
FIG.5B
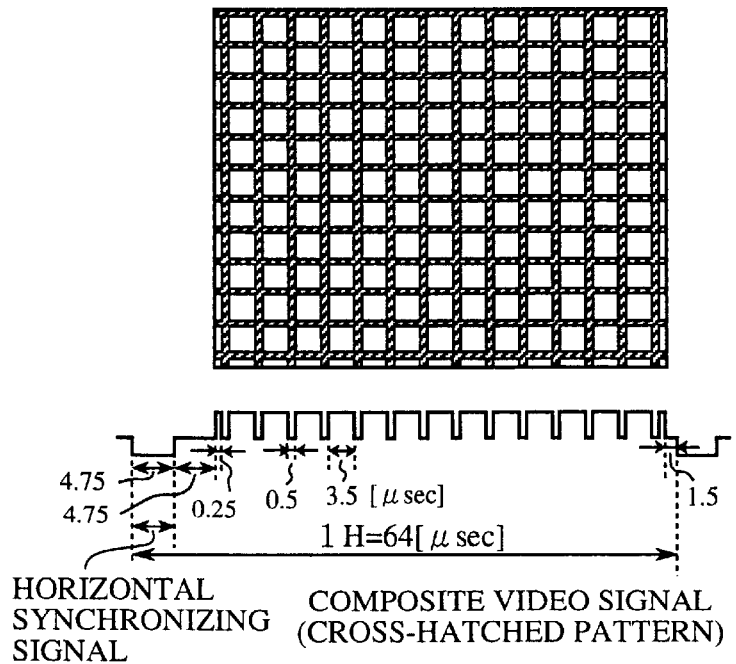

FIG.6
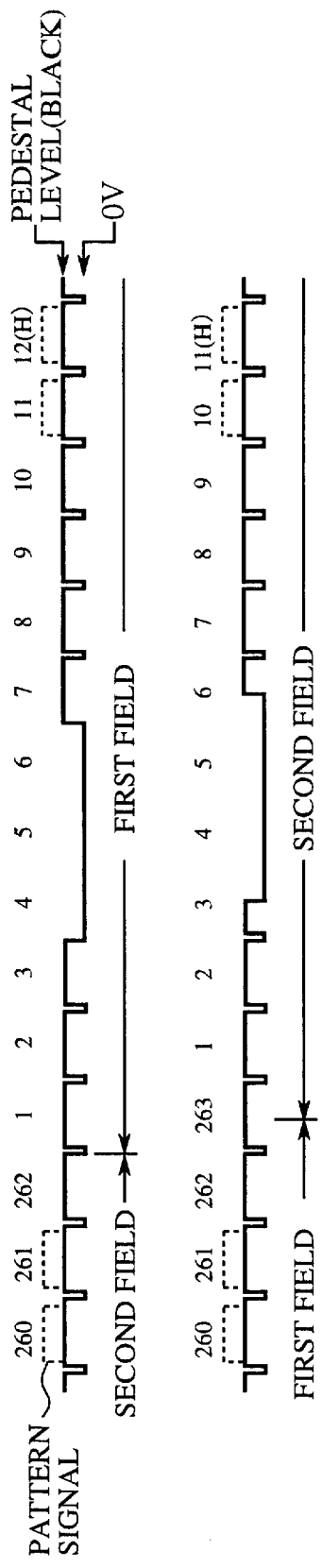
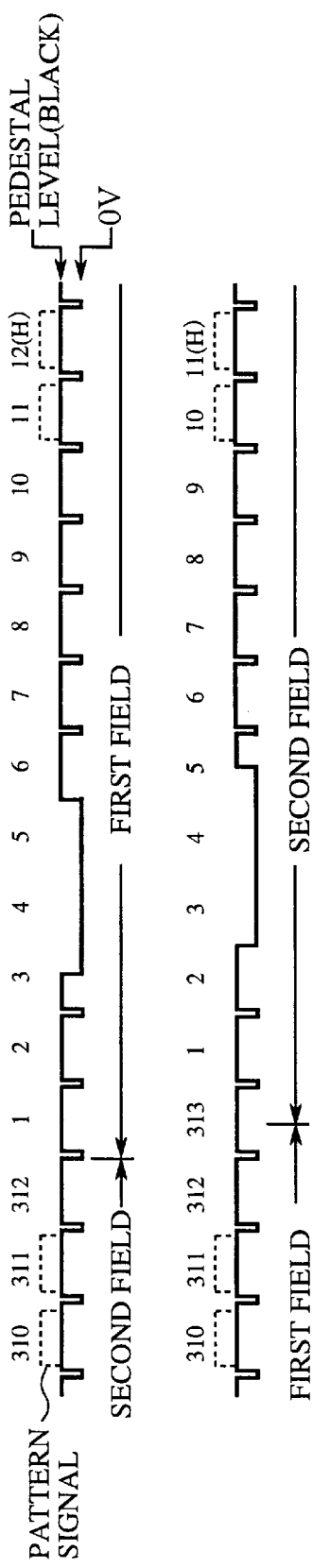

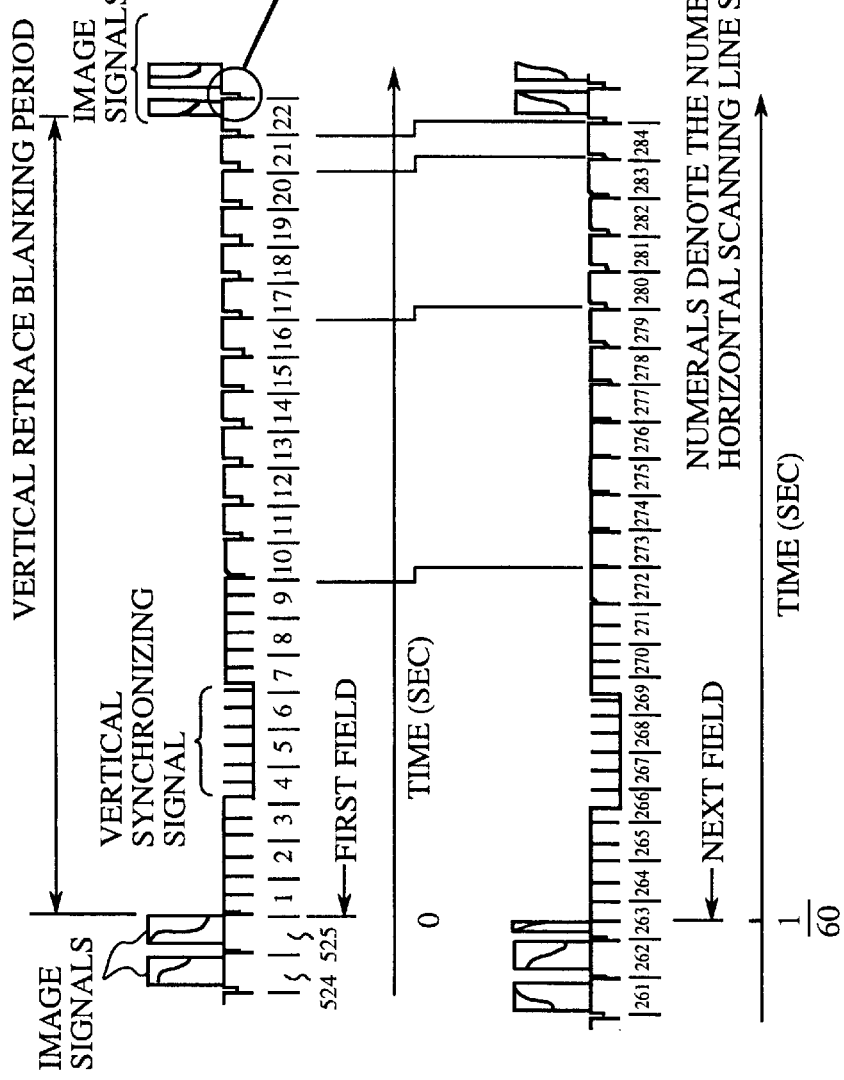

VIDEO SIGNAL PRODUCING APPARATUS AND VIDEO SIGNAL PRODUCING METHOD

BACKGROUND OF THE INVENTION

1. Field of the Invention

The present invention relates to a video signal producing apparatus and a video signal producing method in which a composite video signal used for a television set or a video tape recorder is produced.

2. Description of Related Art

A display principal of a Braun tube used in a television set is initially described in brief.

In a television set, an electron beam is moved in horizontal and vertical directions to display an image on an image plane of a Braun tube. The movement of the electron beam in the horizontal direction is called a horizontal scanning, and the movement of the electron beam from top to bottom is called a vertical scanning. Also, when the horizontal scanning and the vertical scanning are simultaneously performed in the Braun tube, a number of fine loci extending in the horizontal direction appear on the image plane. Each locus is called a horizontal scanning line.

A plurality of broadcast systems for the color television are known, and regulations of National Television System Committee (NTSC) are adopted in Japan. In the NTSC, 525 horizontal scanning lines are used to display a frame-image on the image plane for each frame, and 30 frame-images are sent to the Braun tube every second. In practical use, to suppress the flickering occurring in the frame-images, the 525 horizontal scanning lines of each frame-image is divided into two groups of 262.5 horizontal scanning lines alternately arranged in the 525 horizontal scanning lines to produce two rough images respectively composed of one group of 262.5 horizontal scanning lines from each frame-image (refer to FIG. 10B), and 60 rough images are displayed every second. This scanning is called an interlacing scanning, and each rough image composed of the 262.5 horizontal scanning lines corresponds to one field. The rough image composed of 262.5 horizontal scanning lines numbered by lower serial numerals is called an odd field, and the rough image composed of 262.5 horizontal scanning lines numbered by higher serial numerals is called an even field. The odd and even fields are interlaced with each other for each frame. As shown in FIG. 10B, one odd field is displayed by 262.5 horizontal scanning lines indicated by solid lines, one even field is displayed by 262.5 horizontal scanning lines indicated by broken lines, and the odd fields and the even fields are alternately displayed.

In the horizontal scanning, a horizontal retrace blanking period is provided after the completion of each horizontal scanning. Also, in the vertical scanning, a vertical retrace blanking period is provided after the completion of each vertical scanning. In each retrace blanking period, the electron beam is cut. Therefore, as shown in FIG. 10A, neither horizontal retrace line nor vertical retrace line is displayed on the image plane.

In each horizontal retrace blanking period, a horizontal synchronizing signal $H_{sync}$ is arranged to determine a starting position of the horizontal scanning line. Also, a vertical synchronizing signal $V_{sync}$ is arranged in each vertical retrace blanking period to determine a starting position of the vertical scanning.

The beam operation performed for displaying an image on the image plane of the Braun tube is controlled according to a composite video signal produced in a video processing circuit. In the composite video signal, information of scanning lines, information of the horizontal retrace blanking periods, information of the vertical retrace blanking period, information of the horizontal synchronizing signals, information of the vertical synchronizing signal, field information, and image information (color information and luminance information) are included for each field. In a video tape recorder (called VTR), three cords (yellow, red and white) to be connected with the television set are provided, and the composite video signal is output from the VTR to the television set through the yellow cord.

FIG. 11A is a waveform view showing various signals included in the composite video signal, and FIG. 11B is an enlarged waveform view showing signals arranged in one horizontal retrace blanking period.

As shown in FIGS. 11A and 11B, one horizontal synchronizing signal B and a color burst signal E are arranged in each horizontal retrace blanking period A, and an image signal is arranged in a period other than the vertical retrace blanking period and the horizontal retrace blanking periods.

An image watched by a viewer is formed according to the image signal. A level range C shown in FIG. 11B indicates a luminance range of the image. As a level (or an electric potential) of the image signal is heightened in the level range C, the luminance of the image becomes heightened, and the image approaches the white color. In contrast, as a level of the image signal is lowered in the level range C, the image approaches the black color. That is, the top level (5 V) in the level range C corresponds to the white color, and the bottom level in the level range C corresponds to the black color and is called a pedestal level. The pedestal level is fixed. Also, in cases where a level of the image signal is placed between the top and bottom levels, the image becomes gray, and the luminance of the image changes with the level of the image signal.

The color of the image is determined by a phase difference between the color burst signal E and the image signal. A detail description of the color determination is omitted.

In addition, to indicate the horizontal synchronizing signal $H_{sync}$ and the vertical synchronizing signal $V_{sync}$, a ground level (GND level) set to 0 V is used.

The electron beam is returned from the right side to the left side of the viewer during each horizontal retrace blanking period (refer to FIG. 10A and FIG. 10B) when the viewer watches the image plane, and a horizontal synchronization of the electron beam is performed during the beam returning period according to the horizontal synchronizing signal. Also, the electron beam is returned from the bottom to top (refer to FIG. 10A and FIG. 10B) during the vertical retrace blanking period corresponding to a period of the horizontal scanning lines which are numbered from No. 1 to No. 21.5 for the odd field and are numbered from No. 262.5 to No. 284 for the even field, and a vertical synchronization of the electron beam is performed during the beam returning period according to the vertical synchronizing signal.

The odd and even fields can be distinguished by the phase relationship of the vertical and horizontal synchronizing signals. That is, the horizontal synchronizing signal and the vertical synchronizing signal have the same phase in case of the odd field, and the phase of the horizontal synchronizing signal is opposite to the phase of the vertical synchronizing signal in case of the even field.

FIG. 12 is a constitutional view showing a conventional video signal producing apparatus.

As shown in FIG. 12, a conventional video signal producing apparatus is composed of a video input terminal 1 for receiving a composite video signal indicating a video image from a VTR, an oscillating circuit 8 for generating a main clock signal, a microcomputer-for-television 9 for producing a composite video signal indicating an on-screen display (hereinafter, called OSD) character such as a channel number or a composite video signal indicating a test pattern according to the main clock signal generated by the oscillating circuit 8, outputting the composite video signal of the test pattern indicated by two port output levels (a pattern output level fixed to 5 V and the ground level 0 V), and outputting the composite video signal of the OSD character as a red (R) signal, a green (G) signal and a blue (B) signal indicated by two levels (0 V and 5 V), a pair of patterned resistors 16 and 17, serially connected with each other, for adding the pedestal level (Vp) to the composite video signal of the test pattern output from the microcomputer-for-television 9, a selector 2 for selecting the composite video signal received by the video input terminal 1 or the composite video signal of the test pattern prepared by the microcomputer-for-television 9 and the resistors 16 and 17 according to a first selector control signal output from the microcomputer-for-television 9, an antenna 3 for receiving broadcasting images from a broadcasting station, a tuner 4 for selecting a desired broadcasting image of a desired channel and outputting a composite video signal of the desired broadcasting image, a selector 5 for selecting the composite video signal selected in the selector 2 or the composite video signal output from the tuner 4 according to a second selector control signal output from the microcomputer-for-television 9, a video processing circuit 6 for converting the composite video signal selected in the selector 5 into a video signal, demultiplexing horizontal synchronizing signals $H_{sync}$ and a vertical synchronizing signal $V_{sync}$ from the composite video signal for each field in cases where the composite video signal sent from the video input terminal 1 or the tuner 4 is selected in the selector 5, sending the horizontal synchronizing signals $H_{sync}$ and the vertical synchronizing signal $V_{sync}$ to the microcomputer-for-television 9 in synchronization with the horizontal synchronizing signals $H_{sync}$ and the vertical synchronizing signal $V_{sync}$ multiplexed in the video signal and mixing the R, G and B signals of the OSD character output from the microcomputer-for-television 9 with the video signal, and a Braun tube 7 for displaying the desired broadcasting image or the video image according to the video signal produced in the video processing circuit 6, displaying the test pattern according to the video signal to adjust the Braun tube 7 and displaying the OSD character with the desired broadcasting image or the video image according to the R, G and B signals mixed with the video signal in the video processing circuit 6.

The microcomputer-for-television 9 is composed of a central processing unit (CPU) 10 for controlling constitutional elements of the microcomputer-for-television 9, a composite video signal outputting circuit 11, having a patterned private circuit corresponding to the test pattern, for determining a timing of a field corresponding to the test pattern, a timing of horizontal scanning lines corresponding to the test pattern, a timing of the horizontal retrace blanking period, a timing of the vertical retrace blanking period, a timing of the horizontal synchronizing signal and a timing of the vertical synchronizing signal in the patterned private circuit according to the main clock signal generated in the oscillating circuit 8 under the control of the CPU 10, producing the composite video signal indicating the test pattern from the timings produced in the private circuit, a terminal output control circuit 12 for outputting the first and second selector control signal under the control of the CPU 10 to the selectors 2 and 5, a OSD character output clock circuit 13 for generating an OSD character output clock signal indicating a display period of the OSD character according to a display instruction sent from the CPU 10, and an OSD circuit 14, having an OSD output circuit 15 and an internal read only memory (ROM), for receiving the display instruction of the OSD character from the CPU 10, reading out a dot pattern of the OSD character from the internal ROM according to the display instruction and outputting the dot pattern of the OSD character as the R, G and B signals from R, G and B terminals of the OSD output circuit 15 in synchronization with the OSD character output clock generated by the OSD character output clock circuit 13 and the horizontal synchronizing signals $H_{sync}$ and the vertical synchronizing signal $V_{sync}$ send from the video processing circuit 6.

FIG. 13 is a constitutional view of the OSD output circuit 15.

As shown in FIG. 13, the OSD output circuit 15 is composed of an R output circuit 15a, having a switch, for selecting a Vcc terminal set to 5 V or a GND terminal set to 0V in the switch according to an output control signal and outputting the R signal indicating a dot pattern of the OSD character, of which a red portion is set to 5 V, from the R terminal, a G output circuit 15b, having a switch, for selecting a Vcc terminal set to 5 V or a GND terminal set to 0V in the switch according to the output control signal and outputting the G signal indicating a dot pattern of the OSD character, of which a green portion is set to 5 V, from the G terminal, and a B output circuit 15c, having a switch, for selecting a Vcc terminal set to 5 V or a GND terminal set to 0V in the switch according to the output control signal and outputting the B signal indicating a dot pattern of the OSD character, of which a blue portion is set to 5 V, from the B terminal.

In the above configuration, an operation of the conventional video signal producing apparatus is described.

When a user uses the Braun tube 7, because the user does not generally adjust the Braun tube 7, the selector 2 is preset to select a composite video signal received by the video input terminal 1. Therefore, the composite video signal of the VTR or a composite video signal of a television program sent from the broadcasting station is selected by the selector 5 according to a user's selection and is input to the video processing circuit 6. In the circuit 6, the composite video signal is converted into a video signal, and a video image or a desired broadcasting image of the television program is displayed on the Braun tube 7 according to the video signal.

Also, horizontal synchronizing signals $H_{sync}$ and a vertical synchronizing signal $V_{sync}$ are demultiplexed from the composite video signal for each field in the video processing circuit 6, and the horizontal synchronizing signals $H_{sync}$ and the vertical synchronizing signal $V_{sync}$ are sent to the OSD circuit 14 of the microcomputer for-television 9 in synchronization with the horizontal synchronizing signals $H_{sync}$ and the vertical synchronizing signal $V_{sync}$ multiplexed in the video signal.

In cases where the user desires to display an OSD character such as a channel number "5" on the upper right side of the Braun tube 7 (refer to the Braun tube 7 shown in FIG. 12), the user inputs an instruction to a television set, and a display instruction of the OSD character is sent from the CPU 10 to the OSD circuit 14 and the OSD character output clock circuit 13. In the circuit 13, an OSD character output clock signal indicating a display period of the OSD character is generated and is sent to the OSD circuit 14.

In the OSD circuit 14, a dot pattern of the OSD character is read out from the internal ROM according to the display instruction and is output to the video processing circuit 6 in synchronization with the OSD character output clock signal, the horizontal synchronizing signals $H_{sync}$ and the vertical synchronizing signal $V_{sync}$. In detail, because specific information such as a display position of the OSD character, a display size of the OSD character an da display color of the OSD character is included in the display instruction, the numbers of the horizontal scanning lines corresponding to the dot pattern of the OSD character are determined according to the specific information on the basis of the horizontal synchronizing signals $H_{sync}$ and the vertical synchronizing signal $V_{sync}$ sent from the video processing circuit 6, and the dot pattern of the OSD character is output to the video processing circuit 6 in the display period of the OSD character indicated by the OSD character output clock signal in synchronization with the horizontal synchronizing signals $H_{sync}$ and the vertical synchronizing signal $V_{sync}$.

Thereafter, in the video processing circuit 6, the R, G and B signals indicating the dot pattern of the OSD. character are mixed with the video signal. Thereafter, the OSD character is displayed with the desired broadcasting image or the video image on the Braun tube 7.

FIG. 14 shows an output timing of a dot pattern of a channel number "5" (indicated by an arrow) corresponding to one horizontal scanning line indicated by one horizontal synchronizing signal.

As shown in FIG. 14, when the electron beam is moved to the upper right side of an image displayed on the Braun tube 7, a G signal indicating a dot pattern (that is, a string of dots) of a channel number "5" representing the OSD character is only output from the G terminal to the video processing circuit 6, and a string of green dots is displayed on the upper right side of the image for each horizontal scanning line. Therefore, the channel number "5" indicated by green is displayed with the image.

Next, when the Braun tube 7 is manufactured in a factory, it is required to adjust the Braun tube 7 in the factory. In this case, the selector 2 is set to select a composite video signal sent from the composite video signal outputting circuit 11, and the terminal output control circuit 12 is set under the control of the CPU 10 to make the selector 5 select the composite video signal sent from the selector 2. Thereafter, a composite video signal of a test pattern is produced in the composite video signal outputting circuit 11 and the resistors 16 and 17.

In detail, the composite video signal indicating the test pattern is produced by inputting the main clock signal generated in the oscillating circuit 8 to the private circuit patterned in the composite video signal outputting circuit 11.

Therefore, the composite video signal, in which signals are always multiplexed at fixed timings, can be obtained. In this case, the composite video signal are indicated by the pattern output level fixed to 5 V and the GND level (0 V). However, because the pedestal level having a fixed electric potential is required for the composite video signal to indicate the black color, the horizontal synchronizing signals and the vertical synchronizing signal, the pedestal level of a fixed electric potential is added to the composite video signal by using the resistors 16 and 17 of resistances R1 and R2. In detail, when the pedestal level is set to the composite video signal, the port of the microcomputer-for-television 9 is set to a high impedance condition to obtain an intermediate electric potential VP from the pattern output level fixed to 5 V. Therefore, the pattern output level of the composite video signal set in the composite video signal output circuit 11 is changed to the pedestal level equal to the intermediate level Vp.

$$Vp=\{R2/(R1+R2)\}*5 \qquad (V)$$

Because the pedestal level Vp is obtained from the fixed level 5 V, the pedestal level can be fixed.

Also, when it is desired to remain the composite video signal to the pattern output level or the GND level, the high impedance condition of the port is cancelled.

Thereafter, the composite video signal indicated by the pattern output level (5 V), the GND level (0 V) and the pedestal level (Vp) is sent to the video processing circuit 6 through the selectors 2 and 5 and is converted into a video signal in the video processing circuit 6. Thereafter, the test pattern indicated by the video signal is displayed on the Braun tube 7, in the same manner as the display of the broadcasting image. Therefore, a manufacturer can adjust the Braun tube 7 while viewing the test pattern.

FIG. 15 is an explanatory view showing a cross-hatched pattern representing the test pattern and a waveform of a composite video signal of the cross-hatched pattern corresponding to one horizontal scanning line according to the NTSC.

As shown in FIG. 15, the composite video signal is indicated by the pattern output level fixed to 5 V, the GND level (0 V) and the pedestal level (Vp), and a cross-hatched pattern indicated by black and white (or one brightest color) is shown on the Braun tube 7.

Accordingly, because the main clock signal generated in the oscillating circuit 8 is input to the private circuit patterned in the composite video signal output circuit 11, the composite video signal of the test pattern, of which display modes such as shape, position, size and color are predetermined, is produced, and the test pattern can be reliably displayed on the Braun tube 7.

Also, because the pedestal level is added to the composite video signal indicated by the pattern output level fixed to 5 V and the GND level (0 V) by using the resistors 16 and 17 and controlling the port output level of the composite video signal in the micro computer for-television 9, the test pattern indicated by a color of the highest luminance degree and the black color can be displayed on the Braun tube 7.

However, because the private circuit is required and the resistors 16 and 17 are required to be patterned, there is a drawback that a size of the video signal producing apparatus is enlarged and a manufacturing cost of the video signal producing apparatus is increased.

Also, though the composite video signal having three output levels can be output from the composite video signal output circuit 11 and the resistors 16 and 17, because it is required to set the pedestal level to the fixed level Vp, the pattern output level cannot be adjusted to an arbitrary level. That is, the pattern output level is fixed to 5 V. Therefore, there is another drawback that a color level (or the luminance) of the test pattern indicated by the pattern output level (5 V) cannot be adjusted.

Also, because the test pattern is predetermined in the patterned private circuit, setting conditions (for example, cross-hatched pattern or upper-right side) of the display modes (for example, shape or position) of the test pattern is fixed. Therefore, there is another drawback that the setting conditions of the display modes of the test pattern cannot be easily changed.

SUMMARY OF THE INVENTION

To solve the above drawbacks, a main object of the present invention is to provide a video signal producing apparatus which has a small size and is obtained at a low cost. Also, the main object of the present invention is to provide a video signal producing method performed in the apparatus.

A first subordinate object of the present invention is to provide video signal producing apparatus and method in which the luminance of a test pattern is minutely adjusted.

A second subordinate object of the present invention is to provide video signal producing apparatus and method in which the setting conditions of the display modes of the test pattern are easily changed.

To achieve the main object, a video signal producing apparatus comprising:

synchronizing signal generating means for generating a plurality of horizontal synchronizing signals and a vertical synchronizing signal matching with a videosignal broadcasting standard;

setting means for setting a display mode of one or more characters to set the display mode of a test pattern composed of the characters; and video signal producing means for producing a composite video signal of the test pattern satisfying the display mode set by the setting means according to the horizontal synchronizing signals and the vertical synchronizing signal generated by the synchronizing signal generating means.

When a manufacturer or a user desires to adjust a display apparatus, it is required to send a composite video signal of a test pattern to the display apparatus and to display the test pattern on an image plane of the display apparatus as a test according to the composite video signal.

In the above configuration, a plurality of horizontal synchronizing signals and a vertical synchronizing signal matching with a video signal broadcasting standard to which the display apparatus is adapted are generated by the synchronizing signal generating means for each field. Also, a display mode (for example, shape, position, size, color or luminance degree) of a type of character is set by the setting means, so that the display mode of the test pattern composed of characters of the same type is set. Thereafter, a composite video signal of the test pattern satisfying the display mode is produced according to the horizontal synchronizing signals and the vertical synchronizing signal by the video signal producing means.

Accordingly, because the composite video signal of the test pattern satisfying the display mode can be produced without using any private circuit, the video signal producing apparatus can be produced in a small size. Also, because the video signal producing apparatus is produced in a small size, the cost of producing the video signal producing apparatus can be suppressed.

It is preferred that the display mode of the characters set by the setting means be a display shape of the characters, a display position of each character, a display size of the characters, a display color of each character or the luminance of each character.

In this invention, a display shape (for example, cross-hatched pattern obtained by combining a plurality of squared loops), a position (for example, upper-right side), a size, a color (for example, red) and/or a luminance degree of the test pattern composed of the characters can be set. In particular, a color brightness of the test pattern can be specified by setting the color and luminance.

To achieve the first subordinate object, it is also preferred that the luminance of the characters be set to a particular luminance degree by the setting means as a setting condition of the display mode of the characters, and the video signal producing means comprise an output circuit for selecting a particular electric potential value corresponding to the particular luminance degree of the characters from three or more electric potential values including an electric potential value corresponding to black and an electric potential value corresponding to white and setting the electric potential of a pattern signal corresponding to the characters in the composite video signal to the particular electric potential value.

In this invention, because a particular electric potential value corresponding to the particular luminance degree of the characters is selected from three or more electric potential values, the brightness of the test pattern displayed on the display apparatus can be selected from one or more intermediate brightness degrees other than brightness degrees corresponding to white and black. Accordingly, the brightness (or the luminance) of the test pattern displayed can be minutely adjusted.

It is also preferred that the video signal producing apparatus further comprises:

renewing means for controlling the synchronizing signal generating means to generate a plurality of horizontal synchronizing signals and a vertical synchronizing signal matching with a new video signal broadcasting standard in place of the horizontal synchronizing signals and the vertical synchronizing signal matching with the video signal broadcasting standard.

In the above configuration, one video signal broadcasting standard adapted in the video signal producing apparatus is renewed to a new video signal broadcasting standard such as NTSC, PAL system, Sequential Colors A Memoire (SECAM) or the like. Therefore, even though the display apparatus adapted to one video signal broadcasting standard is changed to a new display apparatus adapted to the new video signal broadcasting standard, the video signal broadcasting standard can be easily renewed to the new video signal broadcasting standard matching with the new display apparatus.

To achieve the second subordinate object, it is also preferred that the video signal producing apparatus further comprises:

changing means for controlling the setting means to set the display mode of the characters to a new setting condition in place of a predetermined setting condition of the display mode.

In the above configuration, even though the display mode (for example, position) of the characters is set to the predetermined setting condition (for example, upper-right side), the predetermined setting condition of the display mode can be changed to a new setting condition (for example, upper-left side). Accordingly, setting conditions of display modes (for example, shape, position, size, color or luminance) for the test pattern can be easily changed.

To also achieve the main object, a video signal producing method, comprising the steps of:

generating a plurality of horizontal synchronizing signals and a vertical synchronizing signal matching with a video signal broadcasting standard;

setting a display mode of one or more characters to set the display mode of a test pattern composed of the characters; and producing a composite video signal of the test pattern satisfying the display mode according to the horizontal synchronizing signals and the vertical synchronizing signal.

In the above steps, the video signal producing method is useful for the video signal producing apparatus manufactured in a small size and at a low cost.

It is preferred that the step of setting the display mode of the characters include the step of:

setting a display shape of the characters, a display position of each character, a display size of the characters, a display color of each character or the luminance of each character as the display mode of the characters.

In the above step, a color brightness of the test pattern can be specified by setting the color and luminance.

To also achieve the first subordinate object, it is also preferred that the step of setting the display mode of the characters include:

setting the luminance of the characters to a particular luminance value as a setting condition of the display mode of the characters, and the video signal producing method further comprising the steps of:

selecting a particular electric potential value corresponding to the particular luminance degree of the characters from three or more electric potential values including an electric potential value corresponding to black and an electric potential value corresponding to white; and setting the electric potential of a pattern signal corresponding to the characters in the composite video signal to the particular electric potential value.

In the above steps, the brightness (or the luminance) of the test pattern displayed can be minutely adjusted.

It is also preferred that the step of generating the horizontal synchronizing signals and the vertical synchronizing signal matching with the video signal broadcasting standard includes the steps of:

renewing the video signal broadcasting standard to a new video signal broadcasting standard; and generating a plurality of horizontal synchronizing signals and a vertical synchronizing signal matching with the new video signal broadcasting standard in place of the horizontal synchronizing signals and the vertical synchronizing signal matching with the video signal broadcasting standard to produce a composite video signal of the test pattern according to the horizontal synchronizing signals and the vertical synchronizing signal matching with the new video signal broadcasting standard.

In the above steps, the video signal broadcasting standard can be easily renewed to the new video signal broadcasting standard matching with the new display apparatus.

To also achieve the second subordinate object, it is preferred that the step of setting the display mode of the characters include the steps of:

changing a predetermined setting condition of the display mode of the characters to a new setting condition; and setting the display mode of the characters to the new setting condition in place of the predetermined setting condition to produce a composite video signal of the test pattern satisfying the display mode set to the new setting condition.

In the above steps, setting conditions of display modes (for example, shape, position, size, color or luminance) for the test pattern can be easily changed.

Also, it is applicable that the test pattern be obtained by combining the characters having the same shape set by the setting means.

Also, it is applicable that the step of setting the display mode of the characters include the steps of:

setting the characters to the same shape; and combining the characters having the same shape to produce the test pattern.

In this invention, because the test pattern is obtained by combining the characters having the same shape, even though a shape of the test pattern is complicated, the test pattern can be easily obtained by combining the characters having the same simple shape. Therefore, a small-sized video signal producing apparatus can be obtained at a low cost.

BRIEF DESCRIPTION OF THE DRAWINGS

FIG. 4 shows an output timing of R, G and B signals corresponding to one horizontal scanning line to which a dot pattern of a channel number is applied;

FIG. 5A is an explanatory view showing a cross-hatched pattern representing the test pattern and a waveform of a composite video signal of the cross-hatched pattern corresponding to one horizontal scanning line according to NTSC;

FIG. 5B shows one type of character having a squared loop shape stored in a memory;

FIG. 6 shows a composite video signal corresponding to an image of the lowest luminance degree according to NTSC and a composite video signal corresponding to an image of the lowest luminance degree according to PAL system;

FIG. 11A is a waveform view showing various signals multiplexed in the composite video signal;

FIG. 11B is an enlarged waveform view showing signals arranged in one horizontal retrace blanking period;

DETAILED DESCRIPTION OF THE PREFERRED EMBODIMENTS

The invention will now be described with reference to the accompanying drawings.

Embodiment 1

Figure 1:
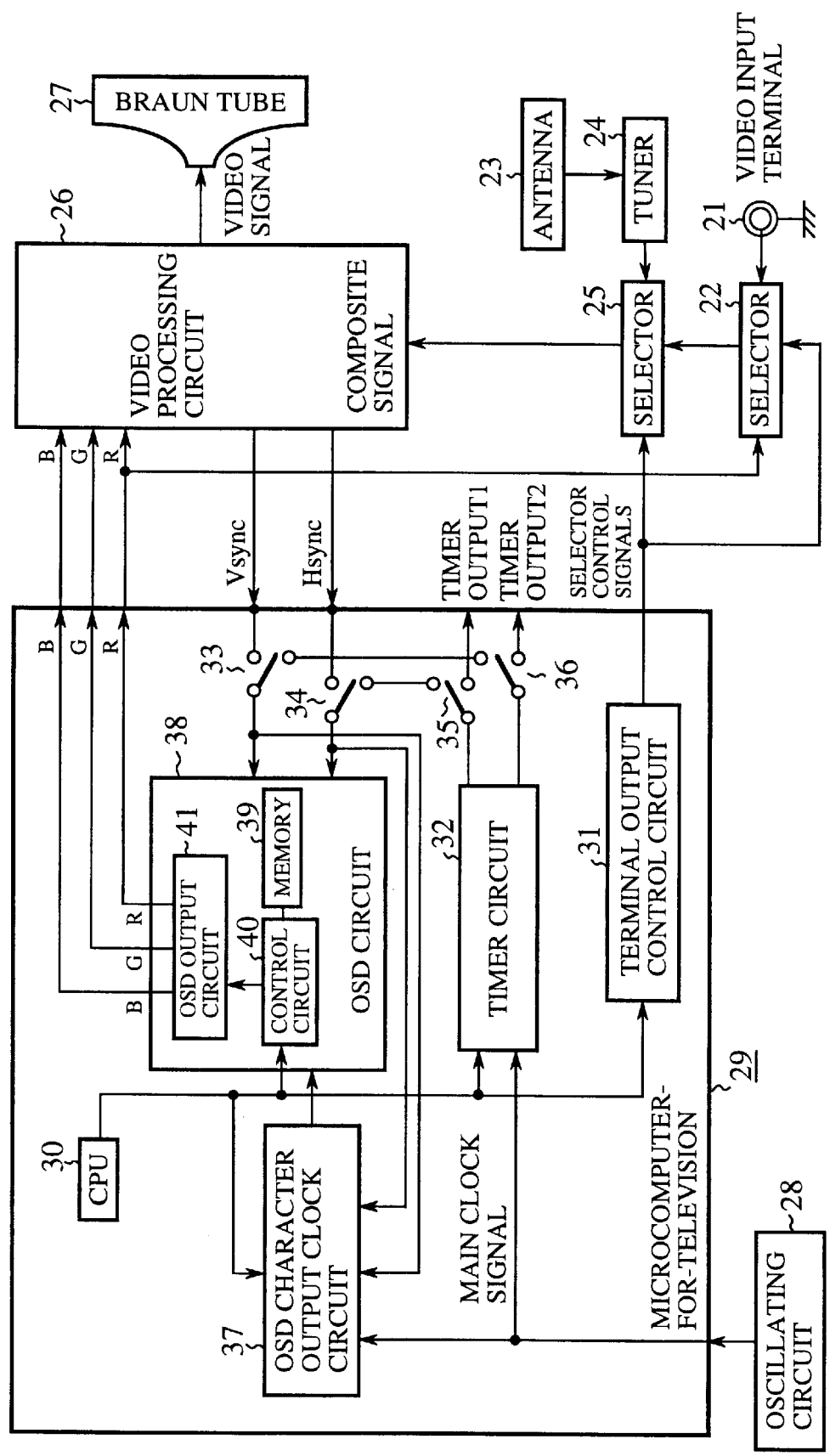
FIG. 1 is a constitutional view of a video signal producing apparatus according to a first embodiment of the present invention.

FIG. 1 is a constitutional view of a video signal producing apparatus according to a first embodiment of the present invention.

As shown in FIG. 1, a video signal producing apparatus comprises:

a video input terminal 21 for receiving a composite video signal indicating a video image based on a group of prescribed video signal broadcasting standards from a VTR, an oscillating circuit 28 for generating a main clock signal, a microcomputer-for-television 29 for producing a composite video signal indicating a test pattern or an on-screen display (hereinafter, called OSD) character such as a channel number, which is possible to have one or more luminance degrees other than luminance degrees corresponding to black (0 V) and white (5 V), according to the main clock signal generated by the oscillating circuit 28, outputting the composite video signal of the test pattern as a red (R) signal and outputting the composite video signal of the OSD character as another red (R) signal, a green (G) signal and a blue (B) signal, a selector 22 for selecting the composite video signal received by the video input terminal 21 or the composite video signal of the test pattern according to a first selector control signal output from the microcomputer for-television 29, an antenna 23 for receiving broadcasting images based on the prescribed video signal broadcasting standards such as NTSC or Phase Alternating by Line (PAL) system from a broadcasting station, a tuner 24 for selecting a desired broadcasting image of a desired channel and outputting a composite video signal of the desired broadcasting image, a selector 25 for selecting the composite video signal selected in the selector 22 or the composite video signal output from the tuner 24 according to a second selector control signal output from the micro computer-for television 29, a video processing circuit 26 for converting the composite video signal selected in the selector 25 into a video signal, demultiplexing horizontal synchronizing signals $H_{sync}$ and a vertical synchronizing signal $V_{sync}$ from the composite video signal selected in the selector 25 for each field, sending the horizontal synchronizing signals $H_{sync}$ and the vertical synchronizing signal $V_{sync}$ to the microcomputer-for-television 29 in synchronization with the horizontal synchronizing signals $H_{sync}$ and the vertical synchronizing signal $V_{sync}$ multiplexed in the composite video signal and mixing the R, G and B signals of the OSD character output from the micro computer-for-television 29 with the video signal, and a Braun tube 27 for displaying the desired broadcasting image or the video image based on the prescribed video signal broadcasting standards according to the video signal produced in the video processing circuit 26, displaying the test pattern based on the prescribed video signal broadcasting standards according to the video signal produced in the video processing circuit 26 to adjust the Braun tube 27 and displaying the OSD character with the desired broadcasting image or the video image according to the R, G and B signals mixed with the video signal in the video processing circuit 26.

The OSD (on screen display) denotes a display method in which a channel number image, an image of a volume indication and/or a blue-back image for the whole image plane is displayed with a- video image on a Braun tube.

The microcomputer-for-television 29 comprises a central processing unit (CPU) 30 for controlling constitutional elements of the microcomputer-for-television 29, a terminal output control circuit 31 for outputting the first selector control signal to the selector 22 under the control of the CPU 10 and outputting the second selector control signal to the selector 25 under the control of the CPU 10, a timer circuit 32, functioning as a synchronizing signal generating means, for generating horizontal synchronizing signals $H_{sync}$ and a vertical synchronizing signal $V_{sync}$ matching with the prescribed video signal broadcasting standards for each field according to the main clock signal generated in the oscillating circuit 28 when a display instruction of the test pattern is received from the CPU 30, the horizontal synchronizing signals and the vertical synchronizing signal being indicated by the lowest level (O V) and the pedestal level (black), an OSD character output clock circuit 37 for generating an OSD character output clock signal indicating a display period of the OSD character according to the main clock signal generated in the oscillating circuit 28 when a display instruction of the OSD character is sent from the CPU 30, and an OSD circuit 38, parts of which function as a setting means and parts of which function as a video signal producing means, for setting display modes of the OSD character and display modes of the test pattern to prescribed setting conditions according to a display instruction received from the CPU 30, producing a composite video signal of the OSD character satisfying the display modes on the basis of the horizontal synchronizing signals $H_{sync}$ and the vertical synchronizing signal $V_{sync}$ sent from the video processing circuit 26, outputting the composite video signal of the OSD character to the video processing circuit 26 according to the OSD character output clock signal generated in the OSD character output clock circuit 37, producing a composite video signal of the test pattern satisfying the display modes on the basis of the horizontal synchronizing signals $H_{sync}$ and the vertical synchronizing signal $V_{sync}$ generated in the timer circuit 32 and outputting the composite video signal of the test pattern to the selector 22 according to the OSD character output clock signal generated in the OSD character output clock circuit 37, and switches 33 to 36 for connecting the OSD circuit 38 with the video processing circuit 26 to send the horizontal synchronizing signals $H_{sync}$ and the vertical synchronizing signal $V_{sync}$ from the video processing circuit 26 to the OSD circuit 38 when the CPU 30 indicates the display of the OSD character and connecting the OSD circuit 38 with the timer circuit 32 to send the horizontal synchronizing signals $H_{sync}$ and the vertical synchronizing signal $V_{sync}$ generated in the timer circuit 32 to the OSD circuit 38 when the CPU 30 indicates the display of the test pattern.

The OSD circuit 38 comprises a memory 39 for storing dot patterns of various OSD characters and storing dot patterns of various types of characters, each of various test patterns being formed by combining the same type of characters, a control circuit 40, parts of which function as the setting means and the video signal producing means for reading a dot pattern of one OSD character or one type of character indicated by the display instruction from the memory 39, setting the display modes of the OSD character or the type of character according to a display mode instruction sent from the CPU 30, producing a composite video signal of red, green and blue portions of the OSD character or a composite video signal of one test pattern composed of the type of characters, and an OSD output circuit 41 for outputting the composite video signal of the OSD character produced in the control circuit 40 from R, G and B terminals to the video processing circuit 26 or outputting the composite video signal of the test pattern produced in the control circuit 40 from the R terminal to the selector 22.

Figure 2:
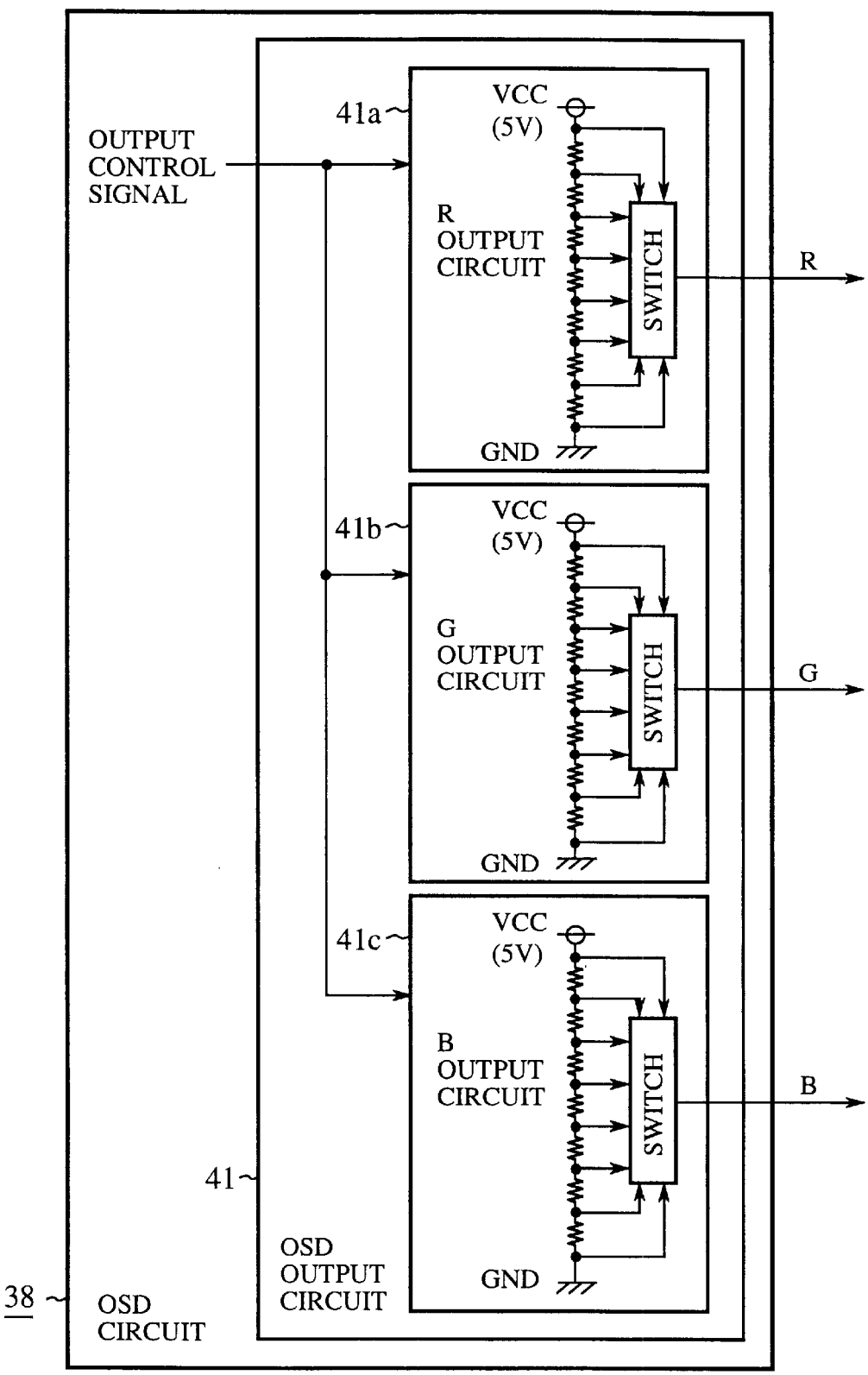
FIG. 2 is a constitutional view showing an OSD output circuit of the video signal producing apparatus shown in FIG. 1.

FIG. 2 is a constitutional view showing the OSD output circuit 41.

As shown in FIG. 2, the OSD output circuit 41 comprises an R output circuit 41*a*, having a change-over switch and seven resistors serially connected with each other, for selecting one output level (or one output electric potential) from eight output levels in the switch according to an output control signal of the control circuit 40 and outputting a dot pattern indicating the red portion of the OSD character or the composite video signal of the test pattern set to the selected output level from the R terminal as an R signal, a G output circuit 41*b*, having a change-over switch and seven resistors serially connected with each other, for selecting one output level from eight output levels in the switch according to the output control signal of the control circuit 40 and outputting a dot pattern indicating the green portion of the OSD character set to the selected output level from the G terminal as a G signal, and a B output circuit 41*c*, having a change-over switch and seven resistors serially connected with each other, for selecting one output level from eight output levels in the switch according to the output control signal of the control circuit 40 and outputting a dot pattern indicating the blue portion of the OSD character set to the selected output level from the B terminal as a B signal.

In each of the output circuits 41*a* to 41*c*, the lowest output level is used to specify horizontal synchronizing signals and one vertical synchronizing signal for each field, the second lowest output level denoting the pedestal level corresponds to black (that is, the lowest luminance degree), and the highest output level corresponds to the brightest color level or white (that is, the highest luminance degree). Therefore, other five output levels denote color levels of the intermediate luminance.

In the above configuration, an operation of the video signal producing apparatus is described.

In cases where a user watches an image displayed on the Braun tube 27, the user does not generally perform the adjustment of the Braun tube 27. Therefore, the selector 22 is preset to select a composite video signal received by the video input terminal 21, the switches 33 and 34 are set to connect the OSD circuit 38 with the video processing circuit 26, and the switches 35 and 36 are set to disconnect the OSD circuit 38 from the timer circuit 32. Therefore, the composite video signal of the VTR or a composite video signal of a television program sent from the broadcasting station is selected by the selector 25 according to a user's selection and is input to the video processing circuit 26. In the circuit 26, the composite video signal is converted into a video signal, and a video image or a desired broadcasting image of the television program is displayed on the Braun tube 27 according to the video signal.

Also, horizontal synchronizing signals $H_{sync}$ and a vertical synchronizing signal $V_{sync}$ are demultiplexed from the composite video signal for each field in the video processing circuit 26, and the horizontal synchronizing signals $H_{sync}$ and the vertical synchronizing signal $V_{sync}$ are sent to the OSD circuit 38 of the microcomputer for-television 29 through the switches 33 and 34 in synchronization with the horizontal synchronizing signals $H_{sync}$ and the vertical synchronizing signal $V_{sync}$ multiplexed in the composite video.signal.

In cases where the user desires to display an OSD character (for example, a channel number "5") on the Braun tube 27 (refer to the Braun tube 27 shown in FIG. 4), the user inputs an instruction to a television set, and a display instruction of the OSD character is sent from the CPU 30 to the OSD circuit 38 and the OSD character output clock circuit 37. In the circuit 37, an OSD character output clock signal indicating a display period of the OSD character is generated and is sent to the OSD circuit 38.

In the OSD circuit 38, a dot pattern of the OSD character is read out from the internal memory 39 to the control circuit 40 according to the display instruction and is output from the R, G and B terminals to the video processing circuit 26 in synchronization with the OSD character output clock signal, the horizontal synchronizing signals $H_{sync}$ and the vertical synchronizing signal $V_{sync}$.

In detail, because a display position of the OSD character, a display size of the OSD character and a display color of the OSD character are included in the display instruction, the numbers of horizontal scanning lines corresponding to the OSD character are specified according to the display position and the display size in the control circuit 40, the composite video signal of the OSD character to be applied on the horizontal scanning lines in the Braun tube 27 are determined as the R, G and B signals according to the display position, the display size and the display color, an output timing of the R, G and B signals indicating the dot pattern of the OSD character is determined according to the horizontal synchronizing signals $H_{sync}$ and the vertical synchronizing signal $V_{sync}$ corresponding to the display position of the OSD character for each of fields in the display period indicated by the OSD character output clock signal, and the R, G and B signals are output according to the output timing to send the dot pattern of the OSD character to the video processing circuit 26.

Thereafter, the dot pattern of the OSD character is mixed with the desired broadcasting image or the video image in the video processing circuit 26, and the dot pattern of the OSD character is displayed with the desired broadcasting image or the video image on the Braun tube 27.

FIG. 4 shows an output timing of the R, G and B signals corresponding to one horizontal scanning line to which a dot pattern of a channel number representing the OSD character is applied.

As shown in FIG. 4, in this example, when the electron beam moves to the upper right side of the image plane, the change-over switch of the G output circuit 41b is only controlled.(that is, an output level of 0 V is selected in the R and B output circuits 41a and 41c), and a G signal of an output level (about 2.1 V) output from the G terminal is applied on one horizontal scanning line corresponding to a central portion (indicated by an arrow) of a channel number "5". Therefore, a string of green dots having a low luminance is displayed as the central portion of the channel number "5" on the upper right side of the image plane. As a result, the channel number "5" representing the OSD character is displayed at the low luminance green.

In each of the output circuits 41a to 41c shown in FIG. 2, because the lowest output level (0 V) is used for the synchronizing signals, the OSD character can be displayed by selecting one of seven luminance degrees.

Next, when the Braun tube 27 is manufactured in a factory, it is required to adjust the Braun tube 27 in the factory. Also, there is a case that a user desires to adjust the Braun tube 27 in his home. In this case, the selector 22 is set to select the R signal sent from the microcomputer-for-television 29 and the microcomputer-for-television 29 is set to make the selector 25 select an output signal sent from the selector 22.

In the above condition, a composite video signal of a test pattern is produced in the microcomputer-for-television 29, the composite video signal is sent from the OSD circuit 38 to the video processing circuit 26 through the R terminal and the selectors 22 and 25, the composite video signal is converted into a video signal in the video processing circuit 26, and the test pattern indicated by the video signal is displayed on the Braun tube 27. Therefore, a manufacturer or the user can adjust the Braun tube 7.

Figure 3:
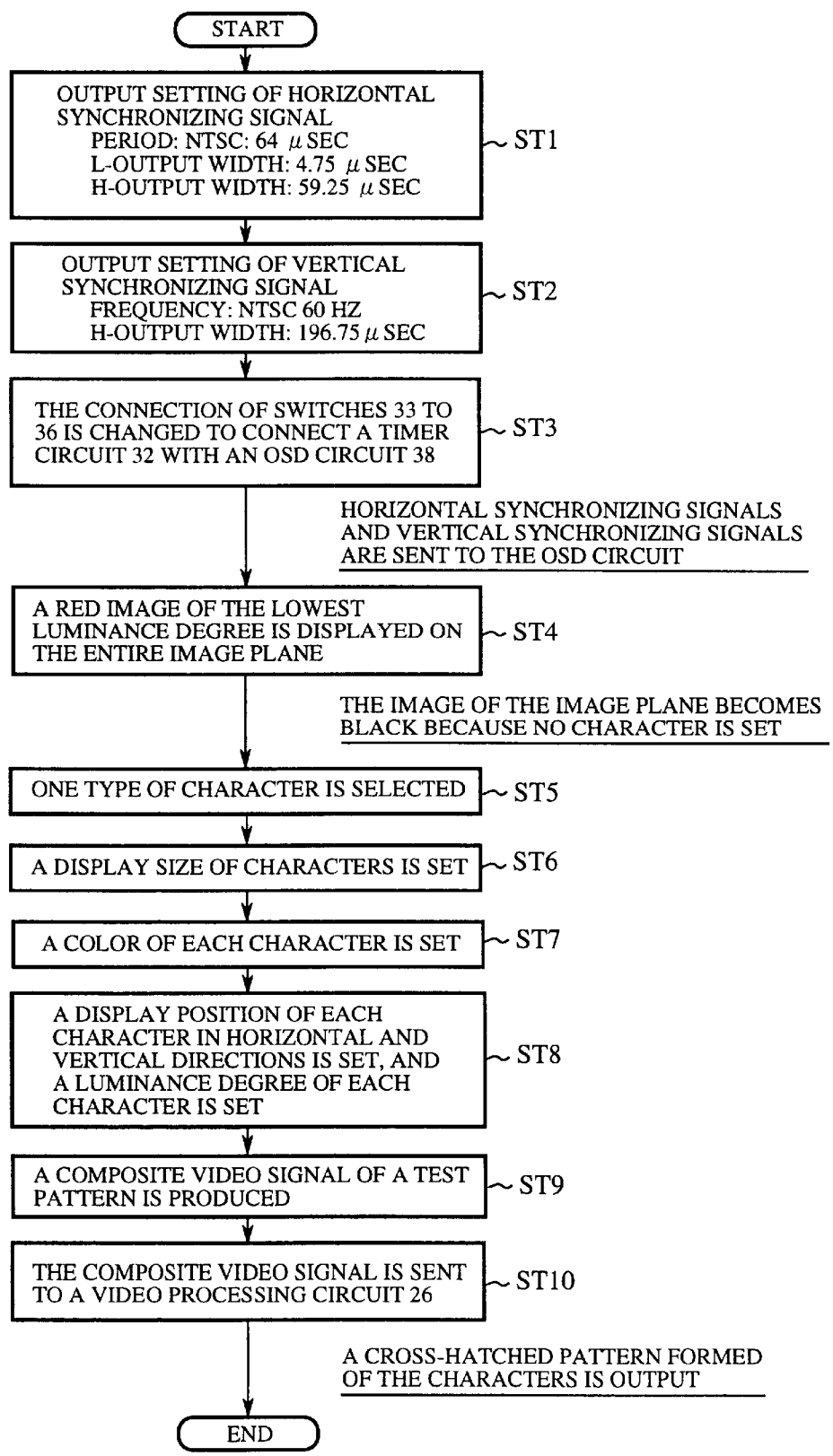
FIG. 3 is a flow chart showing a method for producing a composite video signal of a test pattern in the video signal producing apparatus shown in FIG. 1 according to the first embodiment of the present invention.

FIG. 3 is a flow chart showing a method for producing a composite video signal of the test pattern according to the first embodiment of the present invention. FIG. 5A is an explanatory view showing a cross-hatched pattern representing the test pattern and a waveform of a composite video signal of the cross-hatched pattern corresponding to one horizontal scanning line according to the NTSC. The production of a method for producing a composite video signal of the test pattern is described in detail with reference to FIG. 3.

When a display instruction of the test pattern is sent from the CPU 30 to the timer circuit 32 of the microcomputer-for-television 29, horizontal synchronizing signals $H_{sync}$ and a vertical synchronizing signal $V_{sync}$ matching with the video signal broadcasting standards (for example, NTSC or PAL) are produced in the timer circuit 32 for each field according to the main clock signal generated in the oscillating circuit 28 (steps ST1 and ST2). Also, the switches 33 to 36 are set under the control of the CPU 30 to connect the OSD circuit 38 with the timer circuit 32 and to disconnect the OSD circuit 38 from the video processing circuit 26 (step ST3).

Thereafter, the horizontal synchronizing signals and the vertical synchronizing signal produced in the timer circuit 32 are sent to the OSD circuit 38 through the switches 33 to 36, a composite video signal, in which all pattern signals corresponding to the test pattern are set to the pedestal level, is produced in the control circuit 40 under the control of the CPU 30, the composite video signal is output from the R terminal of the OSD output circuit 41, and a red image of the lowest luminance degree is initially displayed on the entire image plane of the Braun tube 27 according to the composite video signal (step ST4). That is, because a composite video signal composed of horizontal synchronizing signals set to 0V, one vertical synchronizing signal set to 0V and the pattern signals set to the pedestal level corresponding to the black is output to the video processing circuit 26 for each field, an image displayed on the entire image plane of the Braun tube 27 becomes black.

FIG. 6 shows a composite video signal corresponding to an image of the lowest luminance degree according to the NTSC and a composite video signal corresponding to an image of the lowest luminance degree according to the PAL system.

As shown in FIG. 6, a composite video signal corresponding to an image of the lowest luminance degree is indicated by solid lines set to 0 V or the pedestal level, and pattern signals corresponding to an image of a test pattern described later is indicated by broken lines set to a pattern level higher than the pedestal level.

Thereafter, because specific information of a plurality of display modes (for example, shape, position, size, color and luminance) is included in the display instruction of the CPU 30, the display modes of a test pattern are set in the control circuit 40 under the control of the CPU 30 to display the test pattern satisfying the display modes (steps ST5 to ST8).

In detail, because the test pattern is prepared by combining one type of characters having the same shape, a particular type of character corresponding to a desired test pattern is selected from a plurality of types of characters stored in the memory 39 according to the specific information of the display instruction and is read out from the memory 39 to the control circuit 40 (step ST5). For example, as shown in FIG. 5B, a particular type of character having a squared-loop shape is selected, and a cross-hatched pattern shown in FIG. 5A can be obtained as a shape of the test pattern by combining the particular type of characters.

Also, a display size of the characters (step ST6), a display color (for example, red, green or blue) of each character (step ST7), display positions (for example, upper-right side) of the characters in the horizontal and vertical directions (step ST8) and a luminance degree (that is, a level of the pattern signal) of each character (step S8) are set in the control circuit 40 according to the specific information of the display instruction sent from the CPU 30.

Thereafter, a composite video signal satisfying the display modes of the test pattern is produced in the control circuit 40 on the basis of the horizontal synchronizing signals $H_{sync}$ and the vertical synchronizing signal $V_{sync}$ sent from the timer circuit 32 (step ST9).

Figure 7:
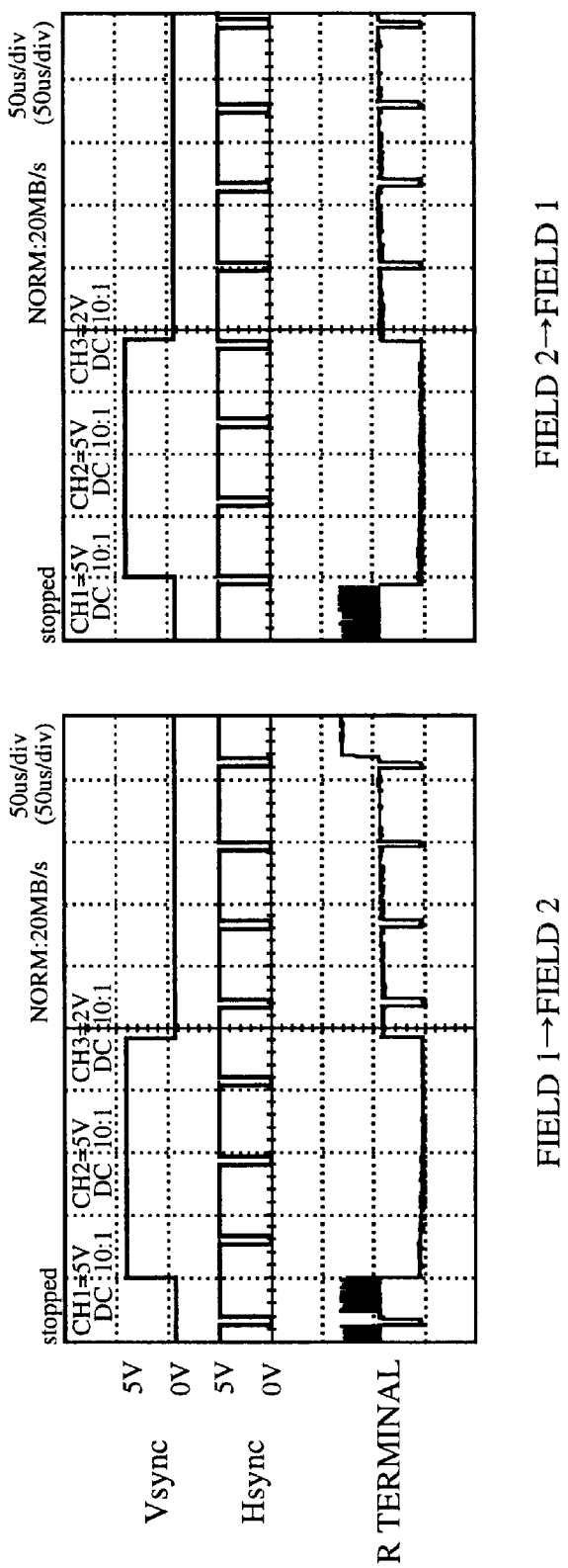
FIG. 7 is an explanatory view showing the relationship between synchronizing signals produced in a timer circuit and a composite video signal prepared in a control circuit.

FIG. 7 is an explanatory view showing the relationship between the synchronizing signals produced in the timer circuit 32 and the composite video signal prepared in the control circuit 40.

As shown in FIG. 7, a series of horizontal synchronizing signals $H_{sync}$ and vertical synchronizing signal $V_{sync}$ indicated by the lowest level (0 V) and the pedestal level (black) is prepared from the horizontal synchronizing signals and the vertical synchronizing signal produced in the timer circuit 32, and pattern signals indicating the test pattern is multiplexed with the series of horizontal synchronizing signals $H_{sync}$ and vertical synchronizing signal $V_{sync}$.

Also, because the level of the composite video signal is selected from eight output levels in each of the R, G and B output circuits of the OSD output circuit 41, a level of the pattern signal is selected from six color levels other than levels corresponding to the black and 0 V. Therefore, a luminance degree of the test pattern is selected from six luminance degrees.

Thereafter, the composite video signal is output from the R terminal of the OSD output circuit 41 to the video processing circuit 26 through the selectors 22 and 25 according to the OSD character output clock signal produced in the OSD character output clock circuit 37 (step ST10). Therefore, the test pattern can be easily prepared by combining the same type of characters set to the setting conditions of the display modes, and the composite video signal shown in FIG. 6 is, for example, produced and sent to the video processing circuit 26.

In this embodiment, the composite video signal of the test pattern is output only from the R terminal to display a red-colored image of the test pattern on the Braun tube 27. However, it is applicable that the composite video signal of the test pattern be output from the G or B terminal. Also, it is applicable that the composite video signal of the test pattern be output from a plurality of terminals selected from the R, G and B terminals.

Figure 8:
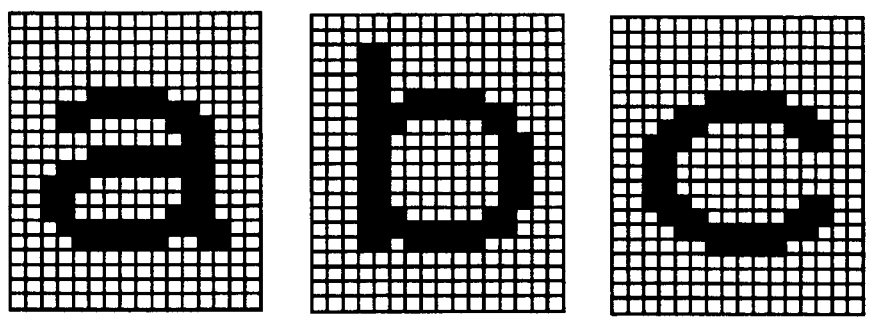
FIG. 8 shows examples of character patterns respectively composed of an OSD character and a test pattern according to a modification of the first embodiment.

Also, the test pattern is prepared by combining the same type of characters. However, it is applicable that an arbitrary OSD character such as a numeral be included in the test pattern (refer to FIG. 8). In this case, a composite video signal is produced from a character pattern obtained by combining characters of the test pattern and the OSD character, and display modes (shape, position, size, color and luminance) of the OSD character are set in the control circuit 40 under the control of the CPU 30 in the same manner as those of the test pattern.

Accordingly, as described above, one type of character corresponding to one test pattern is selected from various types of characters stored in the memory 39, display modes of the type of character are set in the control circuit 40 under the control of the CPU 30, and a composite video signal of the test pattern, which is composed of the same type of characters satisfying the display modes, is produced according to the horizontal synchronizing signals and the vertical synchronizing signal which are produced in the timer circuit 32 and match with the video signal broadcasting standards such as NTSC or PAL. Therefore, because the composite video signal can be manufactured without using any private circuit, a small-sized video signal producing apparatus can be provided. Also, because the small-sized video signal producing apparatus can be provided, the apparatus can be obtained at a low cost.

Also, because an output level of the composite video signal corresponding to the test pattern can be selected from eight output levels in each of the R, G and B output circuits of the OSD output circuit 41, the luminance degree of the type of character can be selected from six luminance degrees other than the luminance degree corresponding to the black. Therefore, the luminance level of the test pattern can be easily adjusted.

Also, because the test pattern is obtained by combining the characters having the same shape, even though the test pattern has a complicated shape such as a shape of the cross-hatched pattern, the test pattern can be obtained by combining characters having the same simple shape such as a squared-loop shape. Accordingly, it is not required to store the test pattern having the complicated shape, a size of the memory 39 can be made small, and the video signal producing apparatus can be manufactured in a small size and at a low cost.

Also, because an output level of the composite video signal corresponding to an OSD character such as a channel number can be selected from eight output levels in each of the R, G and B output circuits of the OSD output circuit 41, the luminance degree of the OSD character can be selected from six luminance degrees. Therefore, the luminance level of the OSD character can be easily adjusted.

Embodiment 2

Figure 9:
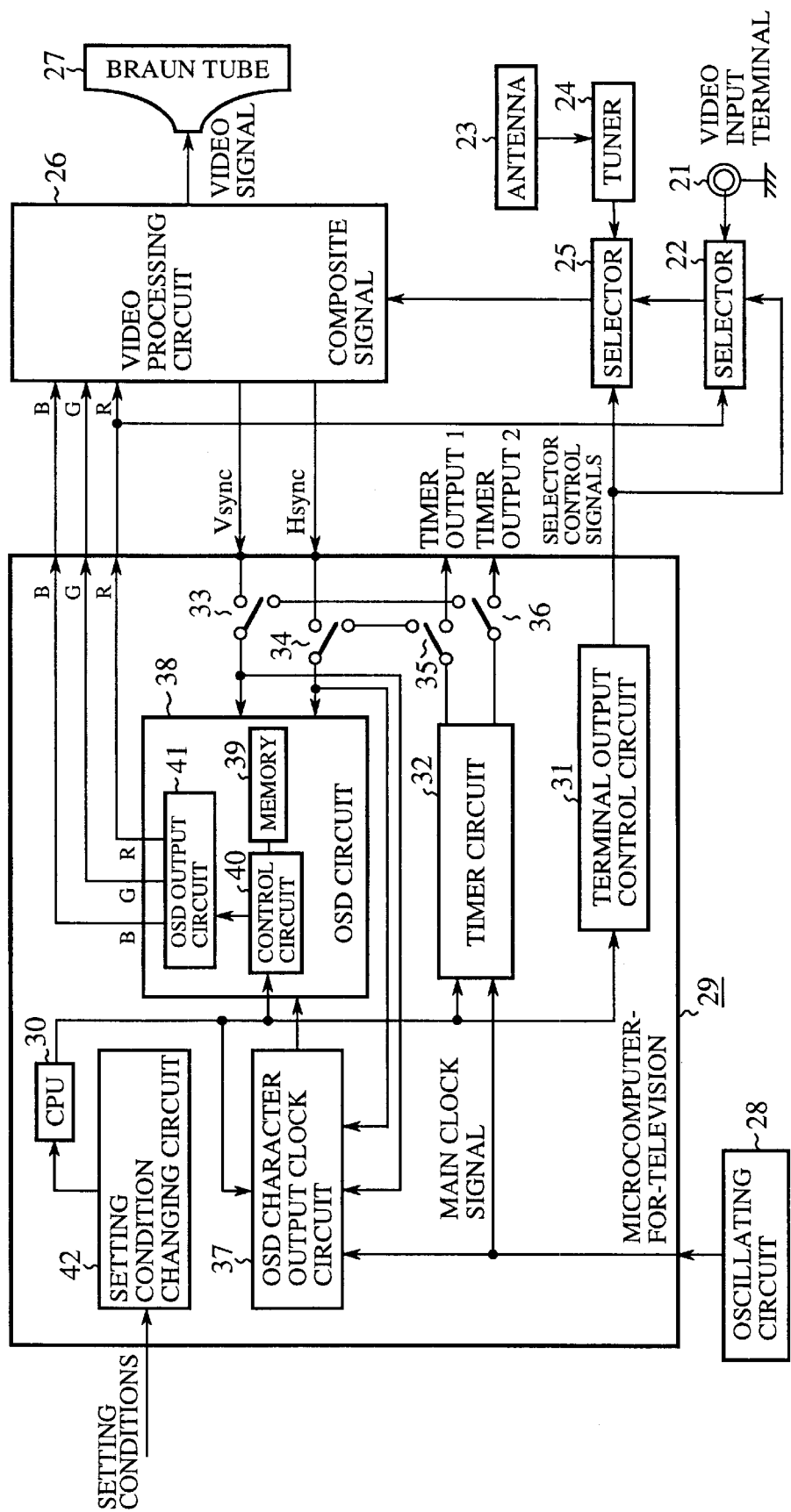
FIG. 9 is a constitutional view of a video signal producing apparatus according to a second embodiment of the present invention.
Figure 10A:
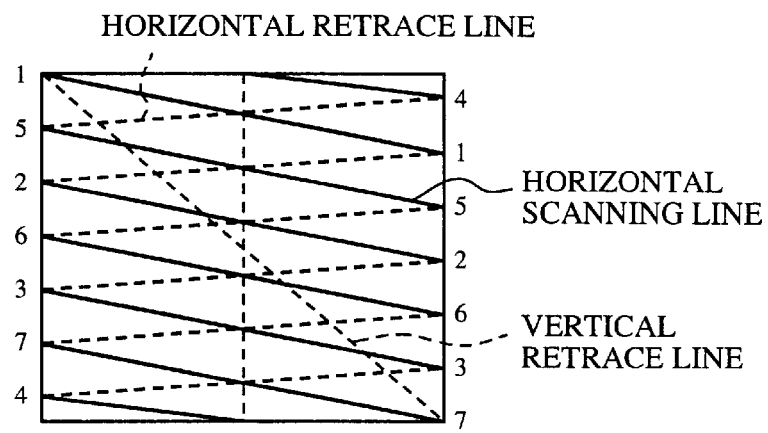
FIG. 10A is an explanatory view showing that any horizontal retrace line or vertical retrace line is not displayed on an image plane.
Figure 10B:
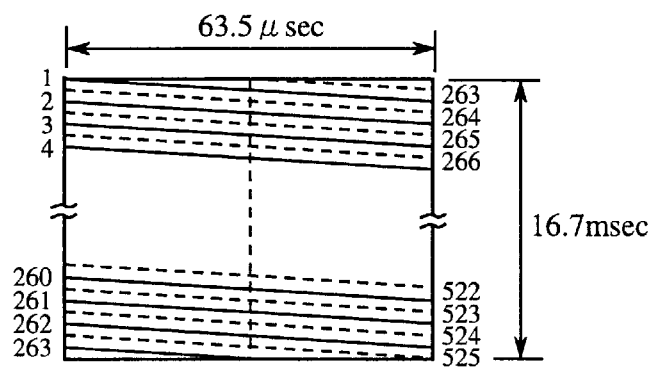
FIG. 10B shows the relationship between an odd field composed of 262.5 horizontal scanning lines (indicated by solid lines) and an even field composed of 262.5 horizontal scanning lines (indicated by broken lines)
Figure 12:
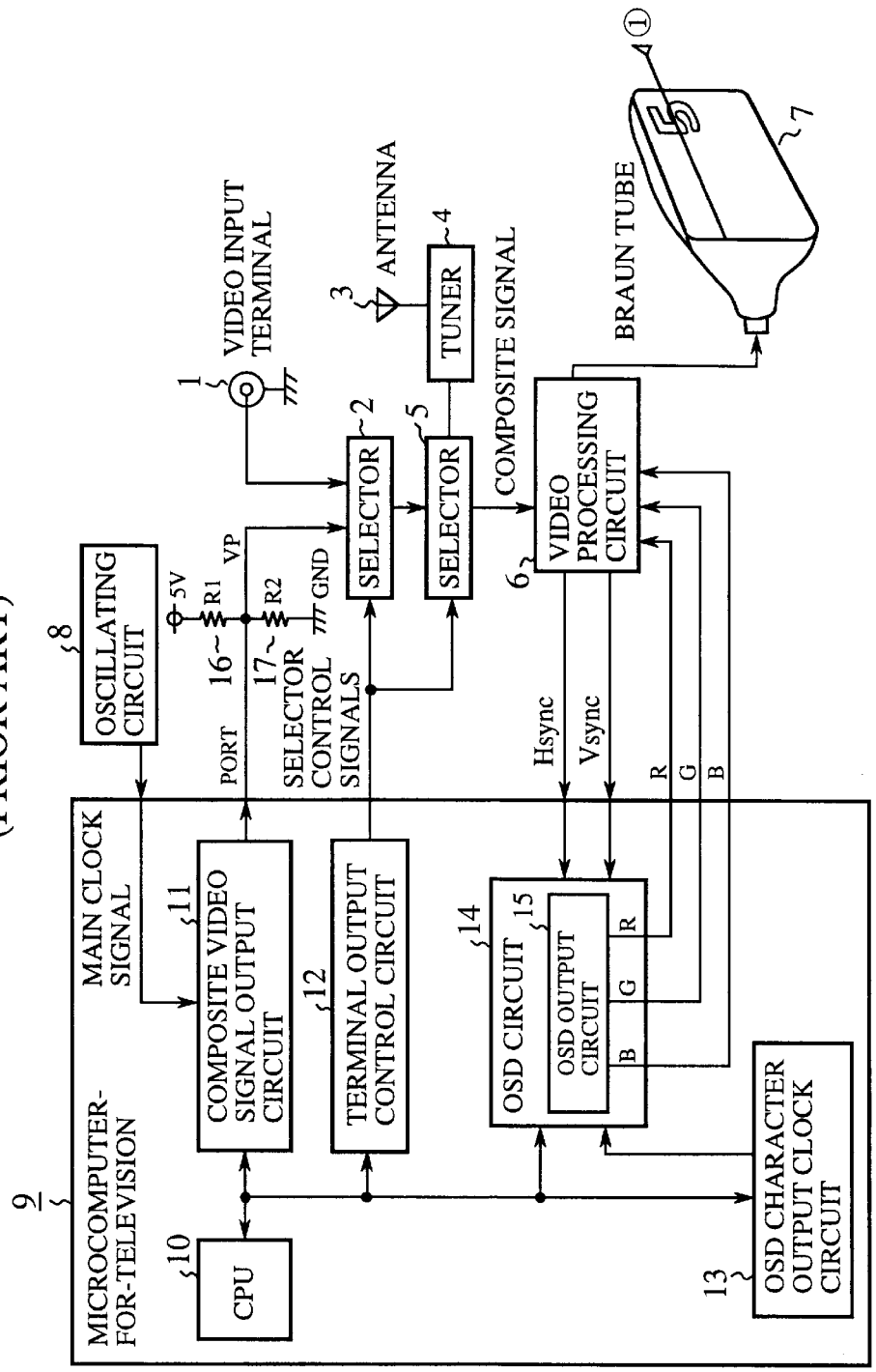
FIG. 12 is a constitutional view showing a conventional video signal producing apparatus.
Figure 13:
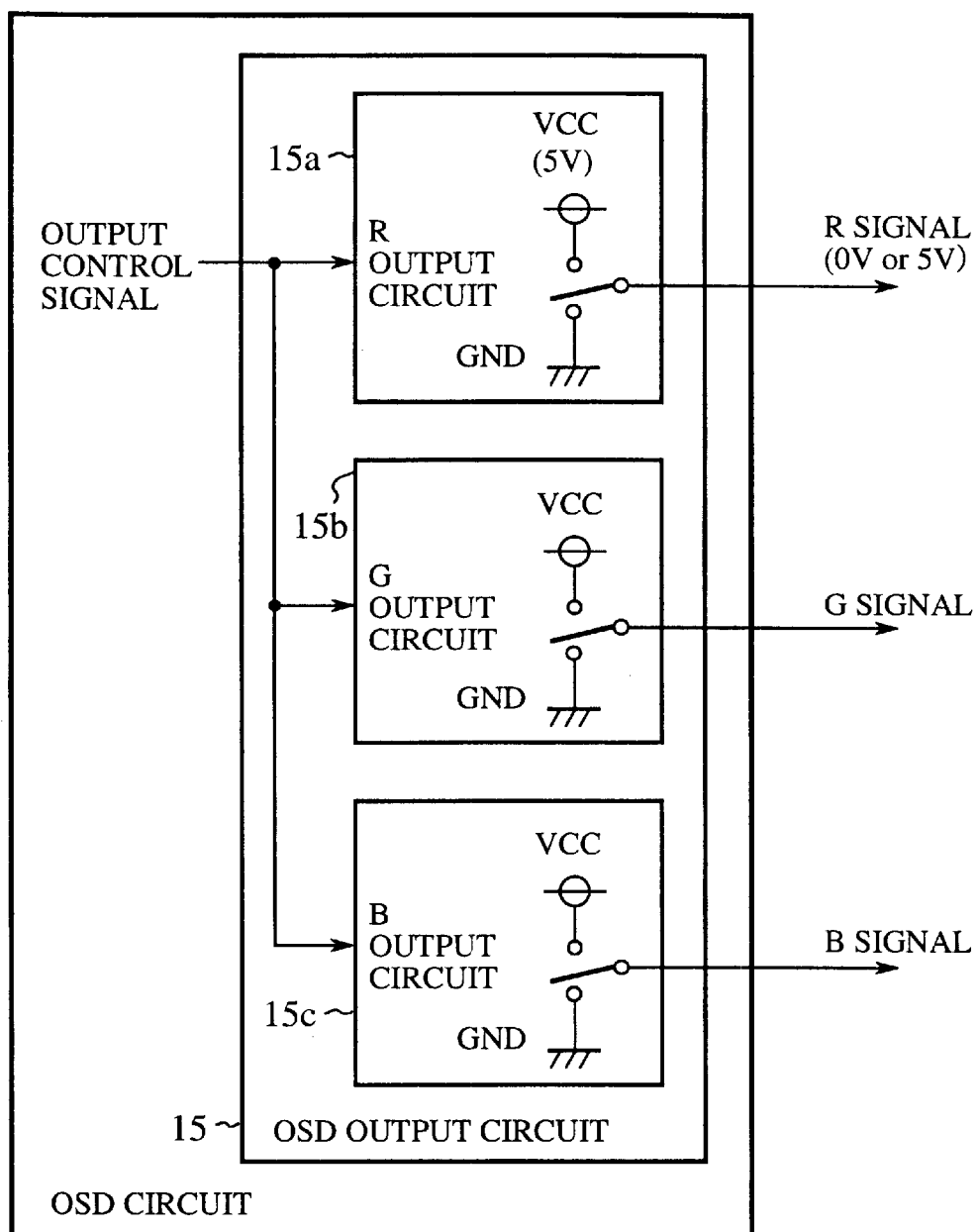
FIG. 13 is a constitutional view of an OSD output circuit.
Figure 14:
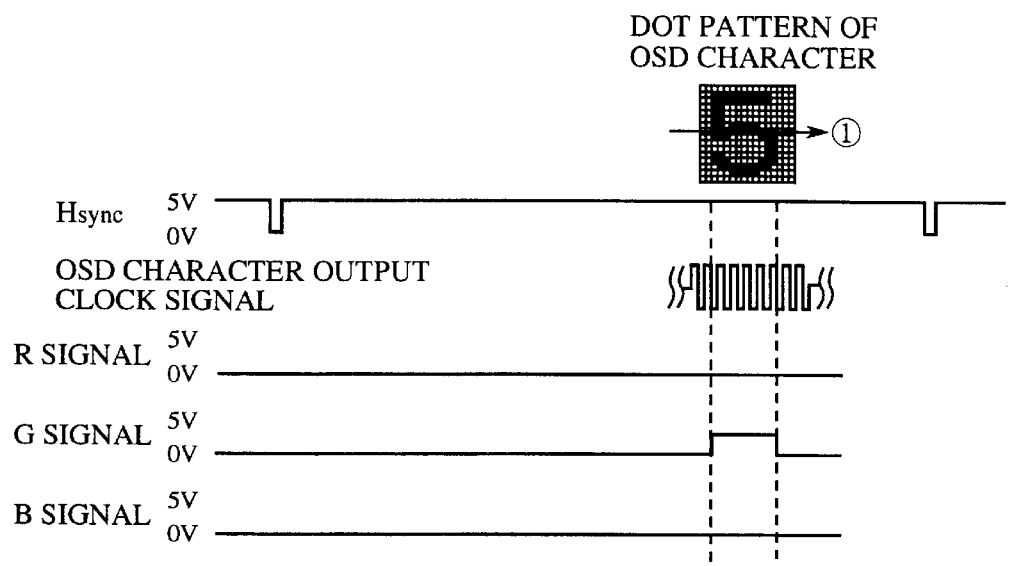
FIG. 14 shows an output timing of a dot pattern of the OSD character (indicated by an arrow) corresponding to one horizontal scanning line indicated by one horizontal synchronizing signal.
Figure 15:
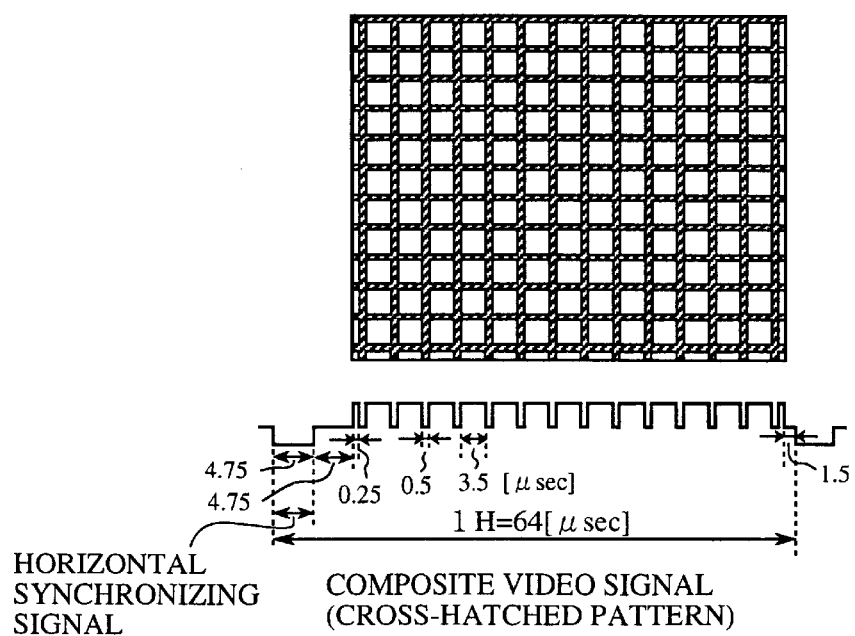
FIG. 15 is an explanatory view showing a cross-hatched pattern representing the test pattern and a waveform of a composite video signal of the cross-hatched pattern corresponding to one horizontal scanning line according to the NTSC.

FIG. 9 is a constitutional view of a video signal producing apparatus according to a second embodiment of the present invention. The description of composing elements indicated in FIG. 9 by reference numerals, which are the same as those used in FIG. 1, is omitted because the composing elements in FIG. 9 are the same as or equivalent to those of FIG. 1 indicated by the same reference numerals as those in FIG. 9.

As compared with the voltage setting circuit shown in FIG. 1, the microcomputer-for television 29 of a voltage setting circuit shown in FIG. 9 further comprises a setting condition changing circuit 42, parts of which function as a changing means and parts of which function as a renewing means, for receiving a setting condition changing instruction indicating one or more new setting conditions of one or more display modes from a user or an external apparatus, instructing the CPU 30 to change one or more predetermined setting conditions of the display modes of a test pattern or an OSD character to the new setting conditions according to the setting condition changing instruction, receiving a broadcast standard renewing instruction indicating a group of new video signal broadcast standards from the user or the external apparatus and instructing the CPU 30 to renew the group of predetermined video signal broadcasting standards such as NTSC or PAL to the group of new video signal broadcasting standards.

In the above configuration, when a user inputs a setting condition changing instruction indicating new setting conditions of the display modes of a test pattern or an OSD character to the setting condition changing circuit 42, the setting condition changing instruction is sent to the CPU 30. Therefore, when the microcomputer-for-television 29 is operated to display a test pattern or an OSD character at predetermined setting conditions (for example, "upper right") of the display modes (for example, position) on the Braun tube 27, a composite video signal of a test pattern or an OSD character satisfying the display modes set to the new setting conditions are produced in the control circuit 40 under the control of the CPU 30, and the test pattern or the OSD character is displayed on the Braun tube 27 at the new setting conditions of the display modes.

Also, when a user inputs a broadcasting standard renewing instruction indicating a group of new video signal broadcasting standards to the setting condition changing circuit 42 because the video processing circuit 26 and the Braun tube 27 are operated according to the group of new video signal broadcasting standards, the broadcasting standard renewing instruction is sent to the CPU 30, horizontal synchronizing signals and a vertical synchronizing signal matching with the group of new video signal broadcasting standards are produced in the timer circuit 32 for each field, and a composite video signal of a test pattern or an OSD character is produced according to the horizontal synchronizing signals and the vertical synchronizing signal matching with the group of new video signal broadcasting standards. Therefore, a video signal matching with the group of new video signal broadcasting standards is produced in the video processing circuit 26, and the test pattern or the OSD character is displayed on the Braun tube 27 without any trouble.

Accordingly, the setting conditions of the display modes of the test pattern or the OSD character predetermined in the microcomputer-for-television 29 can be easily changed to the new setting conditions. Also, the group of video signal broadcasting standards predetermined in the microcomputer-for-television 29 can be easily renewed to the new video signal broadcasting standards such as NTSC, PAL, Sequential Colors A Memoire (SECAM) or the like.

What is claimed is:

1. A video signal producing apparatus, comprising:

synchronizing signal generating means for generating a plurality of horizontal synchronizing signals and a vertical synchronizing signal complying with a prescribed video signal broadcasting standard;

setting means for setting a display mode of two or more characters to set the display mode of a test pattern composed of the characters; and video signal producing means for producing a composite video signal of the test pattern satisfying the display mode set by the setting means according to the horizontal synchronizing signals and the vertical synchronizing signal generated by the synchronizing signal generating means.

2. A video signal producing apparatus according to claim 1, wherein the display mode of the characters set by the setting means is a display shape of the characters, a display position of each character, a display size of the characters, a display color of each character or the luminance of each character.

3. A video signal producing apparatus according to claim 1, wherein the luminance of the characters is set to a particular luminance degree by the setting means as a setting condition of the display mode of the characters, and the video signal producing means comprises an output circuit for selecting a particular electric potential value corresponding to the particular luminance degree of the characters from three or more electric potential values including an electric potential value corresponding to black and an electric potential value corresponding to white and setting the electric potential of a pattern signal corresponding to the characters in the composite video signal to the particular electric potential value.

4. A video signal producing apparatus according to claim 1, further comprising:

renewing means for controlling the synchronizing signal generating means to generate a plurality of horizontal synchronizing signals and a vertical synchronizing signal complying with a new video signal broadcasting standard in place of the horizontal synchronizing signals and the vertical synchronizing signal complying with the prescribed video signal broadcasting standard.

5. A video signal producing apparatus according to claim 1, further comprising:

changing means for controlling the setting means to set the display mode of the characters to a new setting condition in place of a predetermined setting condition of the display mode.

6. A video signal producing apparatus according to claim 1, wherein the test pattern is obtained by combining the characters having the same shape set by the setting means.

* * * * *